US010296512B1

(12) United States Patent
Chandran et al.

(10) Patent No.: US 10,296,512 B1
(45) Date of Patent: May 21, 2019

(54) ACTION-BASED CONTENT SCORING

(71) Applicant: Google LLC, Mountain View, CA (US)

(72) Inventors: Harish Chandran, Sunnyvale, CA (US); Ka Hung Hui, San Jose, CA (US)

(73) Assignee: Google LLC, Mountain View, CA (US)

( * ) Notice: Subject to any disclaimer, the term of this patent is extended or adjusted under 35 U.S.C. 154(b) by 273 days.

(21) Appl. No.: 15/275,261

(22) Filed: Sep. 23, 2016

Related U.S. Application Data

(60) Provisional application No. 62/232,312, filed on Sep. 24, 2015.

(51) Int. Cl.
*G06F 16/2457* (2019.01)
*G06F 16/248* (2019.01)
*G06F 16/438* (2019.01)
*G06F 16/28* (2019.01)
*G06F 16/48* (2019.01)

(52) U.S. Cl.
CPC ...... *G06F 16/24578* (2019.01); *G06F 16/248* (2019.01); *G06F 16/438* (2019.01); *G06F 16/48* (2019.01)

(58) Field of Classification Search
CPC .......... G06F 17/3053; G06F 17/30554; G06F 17/30038; G06F 17/3005; G06F 16/24578; G06F 16/438; G06F 16/48; G06F 16/248
See application file for complete search history.

(56) References Cited

U.S. PATENT DOCUMENTS

| | | | | |
|---|---|---|---|---|
| 2009/0248494 A1* | 10/2009 | Hueter | .................. | G06Q 10/00 705/7.29 |
| 2012/0259919 A1* | 10/2012 | Yan | ........................ | G06Q 30/02 709/204 |
| 2014/0372205 A1* | 12/2014 | Ray | .................... | G06Q 30/0242 705/14.45 |
| 2014/0379310 A1* | 12/2014 | Ramachandran | .. | G06Q 30/0202 703/2 |
| 2015/0006544 A1* | 1/2015 | Isquith | .............. | G06F 17/30029 707/748 |
| 2016/0147767 A1* | 5/2016 | Manning | ........... | G06F 17/30864 715/716 |

* cited by examiner

*Primary Examiner* — Jorge A Casanova
(74) *Attorney, Agent, or Firm* — McDermott Will & Emery LLP (57) ABSTRACT

Aspects of the subject technology relate to systems and methods for action-based content scoring. Scores associated with a content item are determined. Each of the scores is generated by a different predictive model and associated with a respective user interaction type. A composite score for the content item is determined based on at least one of the scores. The content item is provided for display in a content stream associated with a user based on the composite score.

19 Claims, 4 Drawing Sheets

ACTION-BASED CONTENT SCORING

CROSS-REFERENCE TO RELATED APPLICATIONS

The present application claims the benefit of priority under 35 U.S.C. § 119 from U.S. Provisional Patent Application Ser. No. 62/232,312 entitled "Action-Based Content Scoring," filed on Sep. 24, 2015, the disclosure of which is hereby incorporated by reference in its entirety for all purposes.

BACKGROUND

The present disclosure generally relates to content delivery, in particular, to action-based content scoring. Certain web-based applications provide content in the form of content items authored by a variety of users. The content items may be broadcasted by populating content streams. The content items may be presented in reverse chronological order in the content streams, based on a time at which the content items are published on the content streams.

SUMMARY

Aspects of the subject technology relate to a computer-implemented method for facilitating action-based content scoring. The method includes generating, by one or more first computing devices, a first plurality of scores for a first content item received in an online service, each of the first plurality of scores being generated using a respective model of a plurality of predictive models and associated with a different respective user interaction type, determining, by the one or more first computing devices, a first composite score based on the first plurality of scores, determining, by the one or more first computing devices, a position of the first content item among other content items in a content stream associated with a user based on the first composite score, and providing, by the one or more first computing devices, the content stream with the first content item at the determined position to a user computing device for display by the user computing device.

Aspects of the subject technology also relate to a system for facilitating action-based content scoring. The system includes one or more processors and a non-transitory computer-readable medium comprising instructions stored therein, which, when executed by the one or more processors, cause the one or more processors to perform operations. The operations include generating a first plurality of scores for a first content item received in an online service, each of the scores being generated using a respective model of a plurality of predictive models and associated with a different respective user interaction type, determining a first composite score based on the first plurality of scores and preferences of a user with respect to types of user interaction with other content items in the online service, determining a position of the first content item among other content items in a content stream associated with the user based on the first composite score, and providing the content stream with the first content item at the determined position to a user computing device for display by the user computing device.

Aspects of the subject technology also relate to a non-transitory machine-readable medium including instructions stored therein, which when executed by a machine, cause the machine to perform operations. The operations include generating a first plurality of scores for a first content item received in an online service, wherein each of the first plurality of scores is generated using a respective model of a plurality of predictive models and associated with a different respective user interaction type, identifying at least one score of the first plurality of scores based on preferences of a user with respect to types of user interaction with other content items in the online service, determining a first composite score based on the first plurality of scores, determining a position of the first content item among other content items in a content stream associated with the user based on the first composite score, and providing the content stream with the first content item at the determined position to a user computing device for display by the user computing device.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A user may utilize an online service, such as a social network service, to find and consume content items. A content item may include any type of content, such as audio, video, graphics, text, and combinations thereof, which is available online through, for example, the Internet. Content items may include news articles, social network posts, social network event updates, media uploaded by users, comments from users, shares from users, websites, etc. that the user may consume by viewing or interacting with. The social network service may collect or receive content items from various sources, and provide content items to the user in a content stream. Sources for the content items include servers for news services, media services, photo-sharing services, and other content services such that the content items may be requested and retrieved from the servers of the respective services.

A content stream may include one or more content items. For example, the content stream may include a list of content items, which may be updated as new content items are created or retrieved. The content stream may be provided to or by a social network service and be accessible to the user via the social network service, such as on a user interface provided to the user by the social network service. For example, to access the user's content stream, the user may need to initiate a login session for the social network service by logging into an account that the user has created for the social network service. The user interface for displaying the content stream may be provided to the user's computing device upon the user logging into the user's account for the social network service. By way of non-limiting example, the social network service may be accessed through a user interface such as a web page loaded and displayed by a web browser application executing on the user's computing device. The social network service may be accessed through a web application or a standalone client application executed on the user's computing device.

In some implementations, the content stream may streamed to the user interface on the user's computing device, or displayed one page at a time, with each page including a predetermined number of content items (e.g., ten content items). For example, ten content items may be loaded and displayed first in the user interface, allowing the user to examine, navigate (e.g., scroll) through, and select content items. Upon the user reaching a point in the user interface that is indicative of the user reaching an end of these first ten content items, a next set of ten content items may be selected and displayed by the social network service. For example, the next set may be displayed on a subsequent page loaded in the user interface.

Figure 1:
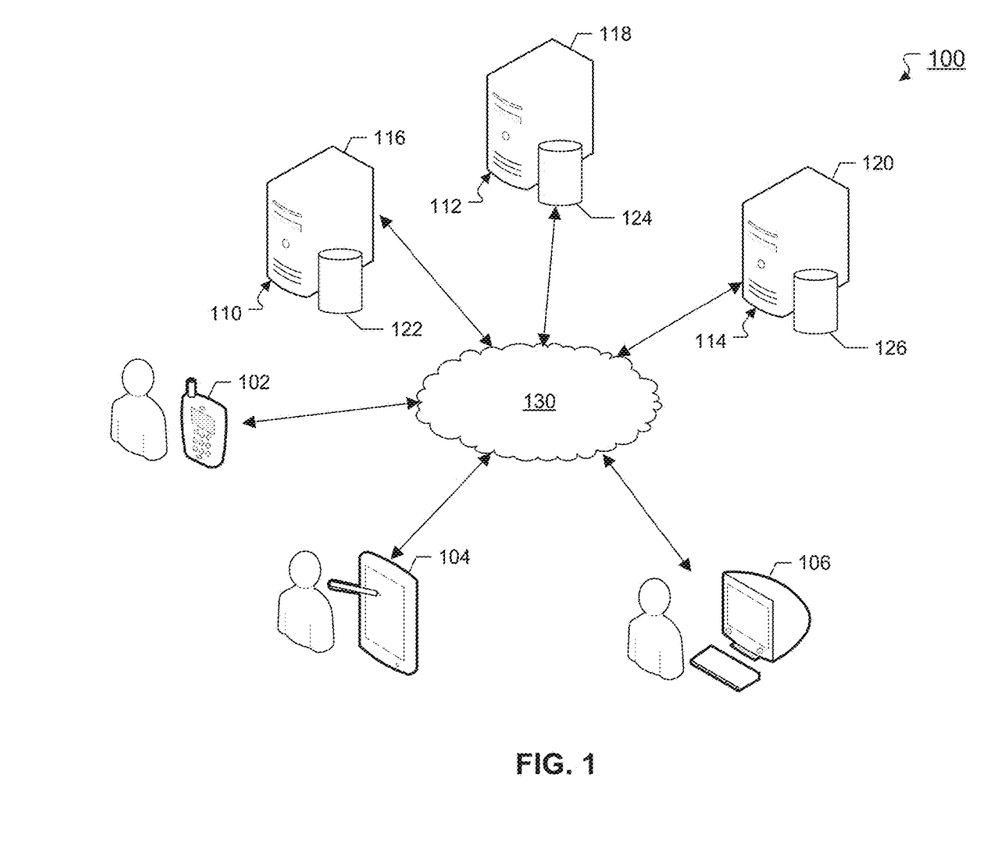
FIG. 1 illustrates an example network environment in which action-based content scoring can be provided, in accordance with one or more implementations.

FIG. 1 illustrates an example network environment 100 in which action-based content scoring can be provided, in accordance with one or more implementations. The network environment 100 includes computing devices 102, 104, and 106 (hereafter "102-106") and computing systems 110, 112, and 114 (hereafter "110-114"). Computing devices 102-106 and computing systems 110-114 can communicate with each other through a network 130. Each of computing systems 110-114 can include one or more servers 116, 118, and 120 and one or more data stores 122, 124, and 126 (e.g., one or more databases). In some aspects, the network environment 100 can have more or fewer computing devices (e.g., 102-106) and/or computing systems (e.g., 110-114) than those shown in FIG. 1.

Each of the computing devices 102-106 can represent various forms of processing devices that have a processor, a memory, and communications capability. Each of the computing devices 102-106 may be associated with a user and utilized by the associated user to access a social network service through, for example, a web page, a web application, or a standalone client application. The computing devices 102-106 may communicate with each other, with the computing systems 110-114, and/or with other systems and devices not shown in FIG. 1. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these processing devices or other processing devices.

Each of the computing systems 110-114 may be any system or device having a processor, a memory, and communications capability for providing a service to the computing devices 102-106. In some example aspects, any of computing systems 110-114 can be a single computing device (e.g., 116) such as, for example, a computer server. In other implementations, any of computing systems 110-114 can represent more than one computing device working together to perform the actions of a computer server (e.g., cluster of machines). Further, any of computing systems 110-114 can represent various forms of servers including, but not limited to, a web server, an application server, a proxy server, a network server, or a server farm.

In some implementations, the computing system 110 may be, may include, or may be a part of, an online server (e.g., a social network server) that hosts an online service. The computing system 110 may act as a repository for content items. Each content item may be associated with one or more entities derived from content and/or source of the content item. An entity may be a person, such as a specific person (e.g., President Washington) or a general type of person (e.g., president). An entity may be a place, such as a specific location (e.g., Washington D.C.) or a general location (e.g., capital). An entity may be an object, such as a specific object (e.g., Washington Monument), general object (e.g., building), or idea (e.g., legacy).

The associations between the entities and the content item are based on the content of the content item. The entities associated with a content item may be determined based on an analysis of the content item. The analysis may include looking for labels (e.g., tags) that have been assigned to the content item, such as by an author of the content item. The analysis may also include identifying keywords and/or key phrases in the content item that are associated with one or more entities, where the associations may be provided in a database that maps entities to keywords and/or key phrases. For example, a content item may be a web page about Redwood National Park. Entities associated with the content item may include, for example, "Redwood National Park," "national parks," "forests," and "trees." The entities and relationships between entities may be stored in the computing system 110 and/or another computing system (e.g., the computing system 112).

The computing system 110 may store (e.g., in data store(s) 122) data related to user accounts and content items associated with the user accounts. For example, the computing system 110 may store a user interaction history (e.g., stored as a log) of actions performed by a user with respect to content items. For example, the user interaction history may indicate content items that have been viewed, shared, commented on, endorsed, etc. by a user account associated with the user. The computing system 110 may store a social connection data structure that is indicative of social connections between user accounts associated with the social network service. The social connections may include friends, family, acquaintances, etc. of the user, as designated by the user. The computing system 110 may store affinities (e.g., interests, disinterests) associated with the user, such as affinities of the user with respect to a particular author, a particular entity, and so forth.

Information associated with the user accounts and, by extension the user, may be available in a user profile, which may be stored on the computing system 110 and/or another computing system (e.g., the computing system 112). In situations in which the systems discussed herein collect personal information about users, or may make use of personal information, the users are provided with an opportunity to control whether programs or features collect user information (e.g., information about a user's social network, a user's browsing data, a user's interaction history, a user's social actions or activities, a user's profession, a user's preferences, or a user's current location), or to control whether and/or how to receive content from a content server that may be more relevant to the user. In addition, certain data may be treated in one or more ways before the data is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user has control over how information is collected about the user and used by a content server.

The computing system 114 may be a third party server for another web service, such as a news service or media service. The computing devices 102-106 may view content items from the computing system 114 or post content items to the computing system 114. The computing system 110 may access content items from the computing system 114. In some implementations, the computing system 114 may be a source of content items for the computing system 110.

In some aspects, the computing devices and systems, including 102-106 and 110-114, may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), Single-carrier Frequency Division Multiple Access (SC-FDMA), or Orthogonal FDMA (OFDMA), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks such as, for example, network 130. Network 130 can be a large computer network such as, for example, a local area network (LAN), wide area network (WAN), the Internet, a cellular network, or a combination thereof connecting any number of mobile clients, fixed clients, and servers. Further, the network 130 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., computing systems 110-114) can occur via a virtual private network (VPN), Secure Shell (SSH) tunnel, or other secure network connection. In some aspects, network 130 may further include a corporate network (e.g., intranet) and one or more wireless access points.

As an illustrative example, a user associated with a user account, using the computing device 102, may access a content stream via a social network service run on the computing system 110. The user may consume (e.g., read, view, click on, activate, download) some content items in the content stream while not consuming other content items in the content stream. What may be considered consumption of a content item may differ between different users and may be heuristically based on client side logic. For example, a usage pattern of a particular user may indicate that the user consumes a content item when the user scrolls or pauses within a boundary of the content item in the content stream for at least a predetermined amount of time (e.g., 3 seconds).

Of the content items that are consumed, the user may perform an interaction with some of these content items. As used herein, the term interaction is used interchangeably with action. Interaction types may include active engagement actions performed on a content item such as, by way of non-limiting example, endorsing the content item, commenting on the content item, resharing the content item (e.g., with other users associated with the user), endorsing a comment provided for the content item, voting (e.g., for a content item associated with a poll), among others. Interaction types may also include passive actions such as, by way of non-limiting example, expanding (e.g., zooming in or zooming out) the content item, selecting (e.g., clicking on) a universal resource locator (URL) contained in the content item, selecting (e.g., clicking on) media contained in the content item, among others.

In some aspects, the computing device 104 may be associated with an author that provides a content item to the computing system 110 to allow the content item to be viewed by other users. An author of a content item may be any user who creates, publishes, or shares content items for viewing by other views. For example, the author may access a web page or a web application of a social network service via the computing device 104 and publish the content item via a user account associated with the author. A user associated with the computing device 102 may view the content item provided by the author. For example, the user associated with the computing device 102 may access a web page or a web application associated with the social network service via the computing device 102 and view the content item in a content stream provided by the computing system 110 to the user.

In one or more implementations, user preferences (e.g., usage patterns of the user) may be determined and the user associated with a user interaction type based on user interaction history. The user interaction history may provide, for example, a listing of content items that have been provided to the user in the user's content stream, and the interaction(s) of the user with the content items. In some aspects, a user type may be associated to the user based on these user preferences, and the associations may be stored in the computing system 110. By way of non-limiting example, the user types may include an "active engager," a "passive viewer," a "new user," a "popular user" (e.g., a celebrity), a user interested in an aspect of a product, among other types. Other user types may be more specifically correlated with an interaction type (e.g., endorsing, commenting, resharing, voting, clicking on, viewing, expanding, and so on).

In some cases, a user may be identified as an active engager when the user's engagement rate (e.g., frequency, number of engagements in a predetermined period of time, etc.) is greater than a predetermined rate, where an engagement rate is a rate at which the user performs an active engagement action (e.g., endorsement, comment). The predetermined rate may be provided in the form of N active engagement actions over a certain time period, such as, for example, 100 engagements over a one month period of time. The predetermined rate may be, or may be based on, an average engagement rate computed based on all users of the social network service. In some cases, a user may be identified as a passive viewer may when the user reads more content items than a predetermined number of content items (e.g., five content items) within a period of time (e.g., a one month period of time) while having an engagement rate lower than the predetermined rate. The passive viewers may, however, perform passive actions at a higher rate than their engagement rate.

Figure 2:
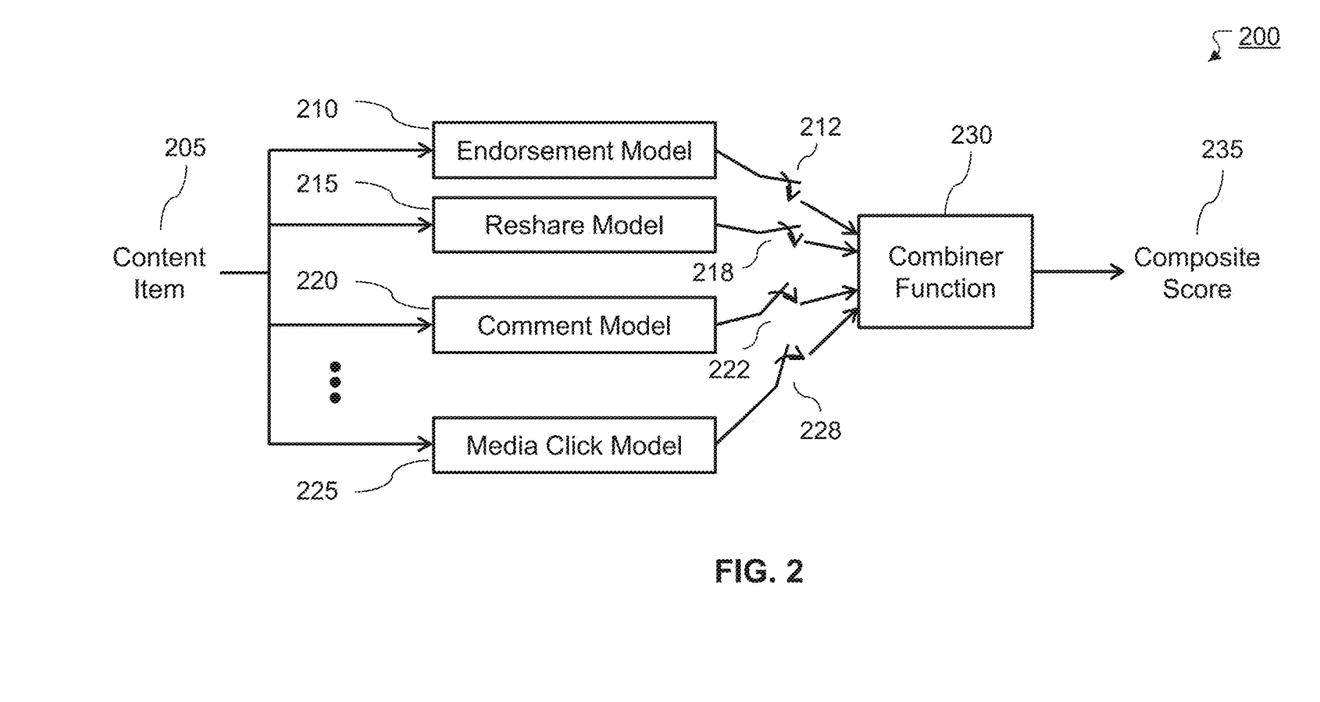
FIG. 2 illustrates an example architecture for facilitating action-based scoring of a content item, according to example aspects of the subject technology.

FIG. 2 illustrates an example architecture 200 for facilitating action-based scoring of a content item 205, according to example aspects of the subject technology. The architecture 200 includes multiple predictive models and/or functions, including an endorsement model 210, a reshare model 215, a comment model 220, and a media click model 225 (hereafter "models 210-225"). Each model may use machine learning and/or statistics to generate a score predictive of a type of user engagement. Each of the models 210-225 is associated with a user interaction type. In the depicted example, models 210, 215, 220, and 225 are associated with an endorsement interaction, reshare interaction, comment interaction, and media click interaction, respectively. The architecture 200 may be utilized, for example, by the computing system 110 to determine respective scores for various content items based on, for example, respective interaction types. For example, the models 210-225 may be utilized to score the content item 205. The combiner function 230 may receive the scores from each of the models 210-225, and then utilize these scores to generate a composite score 235 for the content item 205. In some cases, another computing system (e.g., the computing system 112) may be utilized to determine scores for various content items.

In one or more implementations, the models 210-225 may be trained to generate scores based on user input associated with content items. The user input may include, for example, consumption of a content item with user interaction (e.g., active engagement, passive action), consumption of a content item without user interaction, foregoing consumption of a content item (e.g., skipping past the content item), and so forth. The content items that are utilized in the training of the models 210-225 may be referred to as training samples. The models 210-225 may or may not utilize the same training samples. In some cases, the models 210-225 may be trained simultaneously using the training samples.

The scores from the models 210-225 may be, or may be directly proportional to, probabilities of their associated interaction on a content item for a given user. A custom model may be used for each content item, and the model may generate a higher or lower score based on a higher or lower probability that the user (expected to view the content item) will perform an action of the same interaction type as that used by the model. For example, the endorsement model 210 of a content item may generate a higher score for a given user based on a higher probability that the user will endorse the content item if the content item were to be presented to the user in the user's content stream. In this regard, respective scores from the models 210-225 of a content item for one user may be different from respective scores from the models 210-225 of the content item for another user.

For a given model, a positive training sample is a content item to which a user performs an interaction associated with the given model, whereas a negative training sample is a content item to which a user does not perform the interaction associated with the given model. For example, for the endorsement model 210, a positive training sample is a content item to which the user performs an endorsement interaction whereas a negative training sample is a content item to which the user does not perform an endorsement interaction. In this regard, the same content item may be a positive training sample for some or all of the models 210-225 and/or may be a negative training sample for some or all of the models 210-225.

When training the models 210-225, features associated primarily with a content item, features associated primarily with a user, and/or features associated with the content item and the user may be utilized. By way of non-limiting example, the features associated primarily with the content item may include a number of comments (e.g., at a time of a read event of the content item by the user), a number of reshares (e.g., at a time of a read event of the content item by the user), a total number of endorsements (e.g., at a time of a read event of the content item by the user), a freshness of the content item (e.g., time elapsed since the content item was published in the content stream by an author), amount of content (e.g., length of text) in the content item, type(s) of media (e.g., image, video, audio) embedded in the content item, among others. Other features may include an author (e.g., a famous book author) associated with the content item, an online social community for which the post was intended (e.g., a sports community), public or private status of the content item, audience size (e.g., how many users the content item has been shared with, how many users may view the content item), among others.

By way of non-limiting example, features associated primarily with the user may include information associated a user's account as provided by the user, such as the user's age, gender, nationality, etc.; a country of last sign-in into the social network service by the user; number of content items created by the user (e.g., in the last seven days); number of comments made by the user (e.g., in the last seven days); number of endorsements by the user (e.g., in the last seven days); and computing device utilized by the user (e.g., desktop computer, smart phone, etc.) when accessing the social network service. Information pertaining to these features may be stored, for example, in the computing system 110 associated with the social network server.

By way of non-limiting example, features associated with the content item and the user may include whether the user is one of the engagers (e.g., commenters, endorsers, etc.) of the content item, whether the user is an author of the content item, number of commenters of the content item that are associated with the user (e.g., user's social connections), affinity of the user with the engagers and/or the author of the content item, whether the user has been mentioned (e.g., tagged) by other users (e.g., in the content item itself or in comments to the content item) in relation to the content item, number of users mentioned (e.g., tagged) in the content item that are associated with the user, among others.

By identifying and analyzing the features associated with the content items of the training samples and the user, the models 210-225 may determine an impact of the features on their corresponding interactions. Thus, the models 210-225 may be trained based on at least some of the foregoing features. Based on the training samples, the models 210-225 may determine a weight to be associated with the features. For example, features that are not taken into consideration by a given model may be assigned a zero weight. In this regard, for a given model, features associated with zero weight do not affect the score that is output from the given model.

Different interactions with content items may be performed by users with regard to recently generated content items than with older content items. Accordingly, a content item's age may be relevant in determining which model should be more heavily weighted when calculating a score for a content item. For example, the endorsement model 210 may determine that whether users endorse a content item is highly dependent on a freshness of the content item (e.g., the age of a post in a social network) and thus the model 210 may associate a weight based on the freshness of the content item. On the other hand, the reshare model 215 may determine that whether users endorse a content item do not appear to be dependent on the freshness of the content item and thus the reshare model 215 may not adjust its score based on the freshness of the content item. As an example, a user or group of users may be known to endorse photos posted to a content stream despite the age of the photos, and to reshare content items associated with current events. An endorsement model may be weighted higher than a resharing model for content items related to current events than for content items largely comprising photos, and the resharing model may be weighted higher for the inverse scenario.

Once trained, the models 210-225 may utilize the weights determined for the features when generating their respective scores for content items. The foregoing features are provided by way of non-limiting example. Additional, fewer, and/or different features may be utilized by the models 210-225.

Figure 3:
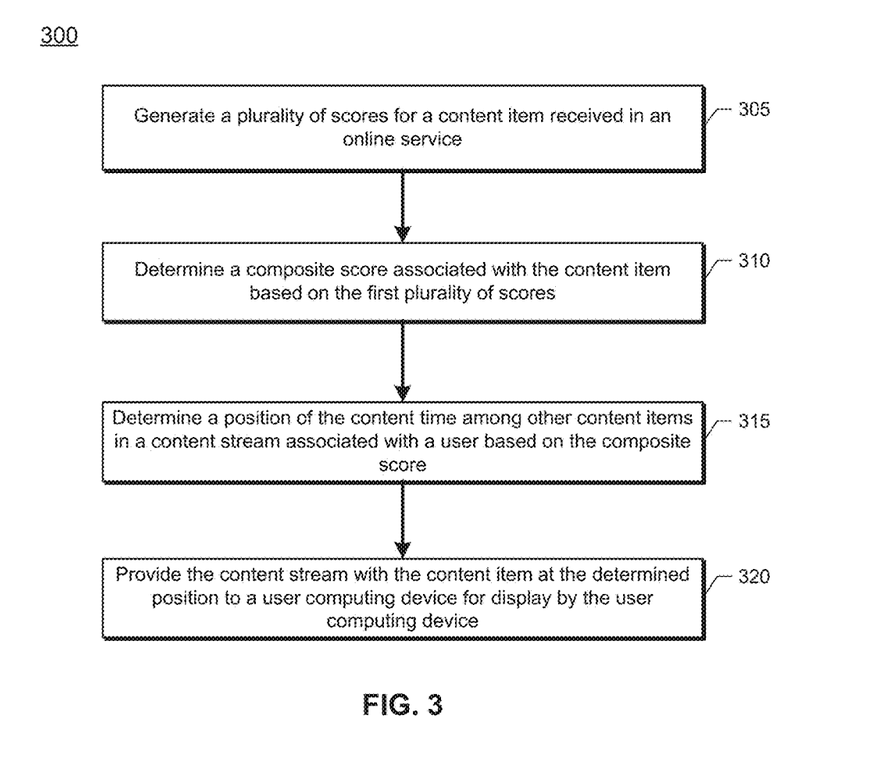
FIG. 3 illustrates a flowchart of a process for action-based content scoring of content items, according to example aspects of the subject technology.

FIG. 3 illustrates a flowchart 300 of a process for action-based content scoring of content items, according to example aspects of the subject technology. For explanatory purposes, example process 300 is described herein with reference to the architecture depicted FIG. 2; however, example process 300 may also be applicable to portions of FIGS. 1 and 4, or other components or component data flows and process described herein. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed. In one or more implementations, the blocks of example process 300 may be performed after the models 210-225 have been trained, as described above.

According to aspects of the subject technology, scoring may be performed on a content item 205 for a user. Based on results of the scoring on the content item 205, the content item 205 may or may not be included in a content stream associated with the user. The content stream may be provided for a user's account that is accessible to the user through a social network service. At block 305, scores for a content item 205 received in an online service are generated. According to some implementations, each of the scores are generated using a respective model of a plurality of predictive models, and each of the scores may be associated with a respective type of user interaction. For example, each of the scores may be generated by one of the models 210-225. The models 210-225 may score the content item 205 based, for example, on the foregoing features and their associated weights. The models 210-225 may score the content item 205 based on user interaction history associated with a user.

The score from each of the models 210-225 may be, or may be directly proportional to, a probability that the user will perform a corresponding interaction. The probability may be utilized as a prediction of whether or not the user will perform the interaction on the content item 205. For example, the score from the media click model 225 may be, or may be directly proportional to, a probability that the user will click on media contained in the content item 205.

At block 310, a composite score 235 for the content item 205 may be determined based on at least one of the scores determined at block 305. The models 210-225 may provide their respective scores to the combiner function 230 to generate the composite score 235 for the content item 205. In some aspects, the respective score from some of the models 210-225 may not be utilized by the combiner function 230 to generate the composite score 235, as represented by switches 212, 218, 222, and 228 in FIG. 2. For example, when the switch 212 is closed (e.g., turned on), the score from the endorsement model 210 is received by the combiner function 230 and utilized in generating the composite score 235. In other words, a closed switch indicates that a non-zero weight is applied to the score generated using the endorsement model 210. As another example, when the switch 228 is open (e.g., turned off), the score from the media click model 225 is not received by the combiner function 230 or otherwise not utilized by the combiner function 230 in generating the composite score 235. In other words, an open switch represents that a zero weight is applied to the score from the media click model 225.

In one or more implementations, the combiner function 230 may determine the composite score 235 based on the user interaction history associated with the user. The combiner function 230 may be referred to as a user-specific combiner function. Based on the user interaction history, the combiner function 230 may determine a weight to be applied to the scores received from each of the models 210-225. For example, if the user interaction history contains information that indicates the user's preference for performing a comment interaction over other interaction types, a higher weight may be applied to the score received from the comment model 220 by the combiner function 230. In some cases, the scores from the models 210-225 to be utilized in determining the composite score 235 may be identified based on user preferences associated with user interaction types (e.g., provided by the user interaction history associated with the user).

In some cases, rather than use information from the user interaction history directly to determine the composite score 235, the combiner function 230 may utilize a user type associated with the user to determine the composite score 235. The user type may be determined based on the user interaction history and stored in the computing system 110. As an example, if the user is identified as an active engager, higher weights may be placed on active engagement interactions (e.g., endorsement, comment, reshare interactions) than on passive interactions (e.g., media click interaction). For instance, the combiner function 230 may apply a zero weight to the score provided by the media click model 225. On the other hand, if the user is identified as a passive viewer, a higher weight may be placed on the score from the media click model 225 than on the remaining models.

The composite score 235 may be a measure of a quality of the content item 205 in relation to the user. The composite score 235 may be, or may be directly proportional to, a probability that the user will perform at least one type of interaction on the content item 205. In FIG. 2, the composite score may be, or may be directly proportional to, that the user will perform at least one of an endorsement interaction, reshare interaction, comment interaction, or a media click interaction.

The combiner function 230 may include, by way of non-limiting example, a single model, a user-specific combiner function, a combine with expression combiner function, a maximum score combiner function, an average score combiner function, a geometric mean score combiner function, a maximum rank combiner function, an average rank combiner function, a Borda count combiner function, a mean normalized maximum combiner function, a mean normalized average combiner function, a mean normalized geometric average combiner function, a median normalized maximum combiner function, a median normalized average combiner function, and/or a median normalized geometric average combiner function.

In the single model combiner function, the combiner function 230 may utilize the score from only one of the models (e.g., one of the models 210-225). For example, weights of the remaining models may be set to zero. In the combine with expression combiner function, the combiner function 230 may utilize an expression to compute the composite score 235 based on the scores from the models 210-225. The expression may be a mathematical expression that includes as variables the scores from some or all of the models 210-225 and/or quantitative representations of the features associated with the content item 205 and/or the user.

In the maximum score combiner function, the combiner function 230 may weigh the scores from the models 210-225 using different weights (e.g., based on user type and/or user interaction history), and the composite score 235 may be a maximum of the weighted scores. The composite score 235 may establish a lower bound on a probability of an interaction being performed on the content item 205. In some cases, the combiner function 230 may normalize the scores of the content item 205 from the models 210-225 using an average score or a median score over all content items scored by the models 210-225, and the composite score 235 may be a maximum of the normalized, weighted scores. The combiner function 230 in such cases may be referred to as a mean normalized maximum combiner function or a median normalized maximum combiner function, respectively. By normalizing the scores, the scores for the different models 210-225 may be provided in a similar range.

In the average score combiner function, the combiner function 230 may weigh the scores from the models 210-225 using different weights (e.g., based on user type and/or user interaction history), and the composite score 235 may be a sum of the weighted scores. The composite score 235 may establish an upper bound on a probability of an interaction being performed on the content item 205. In some cases, the combiner function 230 may normalize the scores of the content item 205 from the models 210-225 using an average score or a median score over all content items scored by the models 210-225, and the composite score 235 may be a sum of the normalized, weighted scores. The combiner function 230 in such cases may be referred to as a mean normalized average combiner function or a median normalized average combiner function, respectively.

In the geometric mean score combiner function, the combiner function 230 may weigh the scores from the models 210-225 using different weights (e.g., based on user type and/or user interaction history), and the composite score 235 may be a product of these weighted scores. In some cases, the combiner function 230 may normalize the scores of the content item 205 from the models 210-225 using an average score or a median score over all content items scored by the models 210-225, and the composite score 235 may be a product of the normalized, weighted scores. The combiner function 230 in such cases may be referred to as a mean normalized geometric average combiner function or a median normalized geometric average combiner function, respectively.

In the maximum rank combiner function, the combiner function 230 may utilize a positional ranking method to generate the composite score 235 for the content item 205. In this regard, within each of the models 210-225, content items, including the content item 205, are ranked based on their corresponding scores. For each content item, the ranks from the different models 210-225 may be weighted by different weights (e.g., based on user type and/or user interaction history). The composite score 235 may be set to the maximum of these ranks. In the average rank combiner function, the composite score 235 may be set to an average rank that is weighted by model weights.

In the Borda count combiner function, the combiner function 230 may utilize the score from each of the models 210-225 to rank the content item 205 and generate the composite score 235 using Borda count. The Borda count is a single-winner election method in which votes rank options or candidates in order of preference. The Borda count determines the outcome of a debate or the winner of an election by giving each candidate, for each ballot, a number of points corresponding to the number of candidates ranked lower.

The type of the combiner function 230 and/or weights utilized by the combiner function 230 may be based on user feedback related to the composite scores generated by the combiner function 230. The user feedback may include the user performing an active engagement action (e.g., mute the content item, comment on the content item), passive action, or forego consumption of the content item. The user feedback may be quantified as a composite user interaction rate including different user interaction types and/or as respective user interaction rates for the different user interaction types.

The user feedback may be utilized as a measure of quality of the composite scores generated by the combiner function 230. For example, in FIG. 2, the user feedback may indicate the quality of the composite scores as a predictor of whether or not the user will perform at least one of an endorsement interaction, reshare interaction, comment interaction, or a media click interaction on a given content item. The type of the combiner function 230 and/or weights utilized by the combiner function 230 may be adjusted based on the user feedback, for example, to improve correlation between the composite scores of the content items generated by the combiner function 230 and actual user interaction rates with the content items.

At block 315, a position of the content item 205 among other content items in a content stream associated with the user may be determined based on the composite score 235. The content item 205 may be displayed in the content stream provided for the user's account on the social network service. The user may access the social network service through a web page associated with the social network service using a web browser application executed on the computing device 102 of the user.

In some cases, the composite score 235 from the combiner function 230 may be utilized to adjust a position of content items within a content stream, and/or to select content items for the content stream of the user and position (e.g., order) the selected content items within the content stream. The content item 205 may be ranked relative to other content items that are potential candidates for inclusion in the content stream of the user. The rank of the content item 205 may be based on the composite score 235 whereas the rank of the other content items may be based on their respective composite scores. If included in the content stream, a position of the content item 205 in the content stream may be set or adjusted based on the rank of the content item 205. In some aspects, if the composite score 235 of the content item 205 is below a predetermined threshold score and/or lower than a respective composite score of at least a predetermined number of content items, the content item 205 may not be provided in the content stream for display to the user.

At block 320, the content stream, with the content item 205 at the position determined at block 315, to a user computing device for display by the user computing device. In one implementation, computing device 112 may receive content items from computing device 110 or 114, and determine a composite score for each of the content items using the previously-described predictive models. Computing device 110, which may host an online service, may then generate the content stream for a user based on the received content items and the composite score generated using computing device 112. Computing device 110 may then provide the stream to an application executing on computing device(s) 102, 104, and/or 106. The content stream is then displayed by the computing device using the application. The generation of the content items, the generation of scores, the generation of the content stream, and/or the display of the content stream may also be performed by any combination of these devices, and/or other devices, or by any one of these devices.

The models 210-225 and combiner function 230 may generate scores at serving time of the content stream, which is the time at which the content stream is to be populated with content items for viewing by a user. In some cases, the combiner function 230 and/or models 210-225 may generate scores based on application or product guidelines. Although the models 210-225 are shown with respect to the architecture 200, the architecture 200 may include additional, fewer, and/or different models than the models 210-225 shown in FIG. 2. Other models may include a mute model, a vote model, a comment endorsement model, a URL click model, and an expand model. The mute model may determine a score that may be, or may be directly proportional to, a probability that the user will mute content items associated with a particular feature (e.g., an author) upon consuming a content item associated with the particular feature.

In one or more implementations, utilization of individual models (e.g., the models 210-225), with each model being associated with a particular interaction, may allow the models to be better optimized for the particular interaction. In this regard, training of the models may allow determination of weights pertaining to features associated with a content item and/or a user for the particular interaction. Features that may cause one interaction type (e.g., an endorsement interaction) may be different from features that may cause another interaction type (e.g., a reshare interaction).

The utilization of individual models followed by a combiner function may allow weights to be applied to the interactions (e.g., scores from each of the models 210-225) during serving time of the content items rather than a training time. Moving a decision on weights to be applied to scores associated with the various interactions may simplify the machine learning process (e.g., training and adjusting of for the models 210-225 and the combiner function 230) and increase flexibility of scoring.

Although the foregoing description has been made with reference to action-based content scoring of content items in a content stream associated with a social network service, the subject technology allows action-based content scoring of other types of application content. Accordingly, the foregoing description also applies to other types of application content. By way of non-limiting example, the subject technology may allow action-based scoring of content such as search results (e.g., from a search engine service), online advertisements, videos (e.g., from a video streaming service), photos, web pages, among others.

Models that are the same as, similar to, and/or analogous to models described in the foregoing models (e.g., URL click model, media click model, comment model, reshare model) may be utilized for these other types of application content. In some cases, the models that are utilized may differ between different application types. The models may be utilized to generate a score that is, or is correlated with, a probability that the application content may cause a user to perform a given action. The scores from the models may then be combined into a composite score (e.g., via a weighted combination) that may be utilized as a measure of a quality of the application content. Weights associated with the various models may be based on application or product guidelines. For example, video streaming services (e.g., content items associated with video streaming services) may have higher weights placed on the scores of some of the models (e.g., the endorsement model 210, the reshare model 215, and the media click model 225) and lower weights placed on other models (e.g., the comment model 220).

Figure 4:
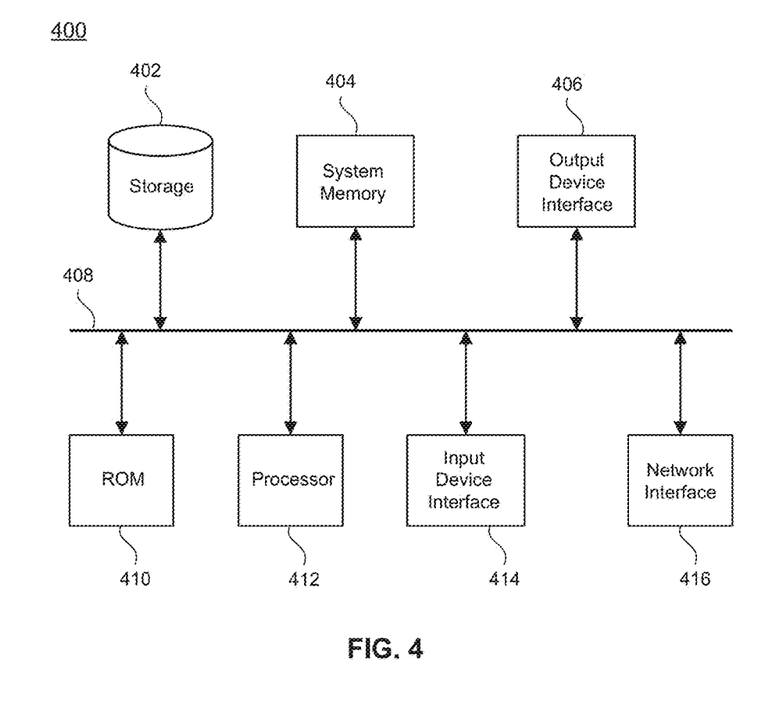
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. The computing devices 102-106 and computing systems 110-114 of FIG. 1 may be or may include the electronic system 400. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as a random access memory. System memory 404 stores some of the instructions and data that the processor needs at runtime. In some implementations, the processes of the subject disclosure are stored in system memory 404, permanent storage device 402, or ROM 410. For example, the various memory units include instructions for determining scores associated with content items, in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network (LAN), a wide area network (WAN), or an Intranet, or a network of networks, for example, the Internet). Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computer-implemented method, comprising:
    generating, by one or more first computing devices, a first plurality of scores for a first content item received in an online service, each of the first plurality of scores being generated using a respective model of a plurality of predictive models and associated with a different respective user interaction type;
    determining, by the one or more first computing devices, a first composite score based on the first plurality of scores;
    determining, by the one or more first computing devices, a position of the first content item among other content items in a content stream associated with a user based on the first composite score;

providing, by the one or more first computing devices, the content stream with the first content item at the determined position to a user computing device for display by the user computing device;

generating a second plurality of scores for a second content item received in the online service, each of the second plurality of scores being generated using a respective model of the plurality of predictive models and associated with one of the different respective user interaction types;

determining a second composite score based on the second plurality of scores; and determining a position of the second content item among other content items in the content stream associated with the user based on the second composite score, wherein a relative position of the first content item and the second content item in the content stream is based on the first composite score and the second composite score.

2. The method of claim 1, further comprising:

determining user interaction with a plurality of content items received in the online service; and training the plurality of predictive models based on the determined user interaction with the plurality of content items.

3. The method of claim 2, wherein:

the plurality of content items is associated with a plurality of features, the training comprises determining respective weights for a respective set of features among the plurality of features for each of the plurality of predictive models, and each of the first plurality of scores is generated using one of the plurality of predictive models based on the respective weights.

4. The method of claim 1, further comprising determining preferences of the user with respect to types of user interaction with other content items in the online service based on a user interaction history associated with the user, wherein the first composite score is further based on the determined preferences.

5. The method of claim 4, wherein:

the first composite score is based on a weighted combination of the first plurality of scores, and a respective weight associated with each of the first plurality of scores is based on the determined preferences.

6. The method of claim 1, further comprising:

associating the user with one or more user types based on a user interaction history of past interactions of the user with content items provided by a content service; and identifying at least one score of the first plurality of scores based on the one or more user types associated with the user, wherein the identified at least one score is weighted more than at least one other score in the first plurality of scores when determining the first composite score.

7. The method of claim 1, wherein each of the different respective user interaction types comprises a different one of sharing the first content item, commenting on the first content item, endorsing the first content item, endorsing a comment associated with the first content item, voting on a poll associated with the first content item, expanding the first content item, clicking on a link contained in the first content item, or clicking on media embedded in the first content item.

8. The method of claim 1, further comprising:

determining a rank of the first content item based on the first composite score, wherein the position of the first content item among the other content items in the content stream is based on the determined rank and a respective rank of each of the other content items.

9. The method of claim 1, wherein the position of the first content item is determined when the first composite score exceeds a respective composite score of at least a predetermined number of content items of a plurality of content items.

10. The method of claim 1, wherein the position of the first content item is determined when the first composite score exceeds a predetermined threshold score.

11. A system, comprising:

one or more processors; and a non-transitory computer-readable medium comprising instructions stored therein, which, when executed by the one or more processors, cause the one or more processors to perform operations comprising:

generating a first plurality of scores for a first content item received in an online service, each of the scores being generated using a respective model of a plurality of predictive models and associated with a different respective user interaction type;

determining a first composite score based on the first plurality of scores and preferences of a user with respect to types of user interaction with other content items in the online service;

determining a position of the first content item among other content items in a content stream associated with the user based on the first composite score;

providing the content stream with the first content item at the determined position to a user computing device for display by the user computing device;

generating a second plurality of scores for a second content item received in the online service, each of the second plurality of scores being generated using a respective model of the plurality of predictive models and associated with one of the different respective user interaction types;

determining a second composite score based on the second plurality of scores; and determining a position of the second content item among other content items in the content stream associated with the user based on the second composite score, wherein a relative position of the first content item and the second content item in the content stream is based on the first composite score and the second composite score.

12. The system of claim 11, wherein the operations further comprise:

determining user interactions with a plurality of content items received in the online service; and training the plurality of predictive models based on the determined user interactions with the plurality of content items.

13. The system of claim 12, wherein:

the plurality of content items is associated with a plurality of features, the training comprises determining respective weights for a respective set of features among the plurality of features for each of the plurality of predictive models, and each of the first plurality of scores is generated using one of the plurality of predictive models based on the respective weights.

14. The system of claim 11, wherein:

the first composite score is based on a weighted combination of the first plurality of scores, and a respective weight associated with each of the first plurality of scores is based on the preferences.

15. The system of claim 11, wherein the operations further comprise:

associating the user with one or more user types based on a user interaction history of past interactions of the user with content provided by a content service; and identifying at least one score of the first plurality of scores based on the one or more user types associated with the user, wherein the identified at least one score is weighted more than at least one other score in the first plurality of scores when determining the first composite score.

16. A non-transitory machine-readable medium comprising instructions stored therein, which when executed by a machine, cause the machine to perform operations comprising:

generating a first plurality of scores for a first content item received in an online service, wherein each of the first plurality of scores is generated using a respective model of a plurality of predictive models and associated with a different respective user interaction type;

identifying at least one score of the first plurality of scores based on preferences of a user with respect to types of user interaction with other content items in the online service;

determining a first composite score based on the first plurality of scores;

determining a position of the first content item among other content items in a content stream associated with the user based on the first composite score;

providing the content stream with the first content item at the determined position to a user computing device for display by the user computing device;

generating a second plurality of scores for a second content item received in the online service, each of the second plurality of scores being generated using a respective model of the plurality of predictive models and associated with one of the different respective user interaction types;

determining a second composite score based on the second plurality of scores; and determining a position of the second content item among other content items in the content stream associated with the user based on the second composite score, wherein a relative position of the first content item and the second content item in the content stream is based on the first composite score and the second composite score.

17. The non-transitory machine-readable medium of claim 16, wherein the operations further comprise:

determining user interactions with a plurality of content items received in the online service; and training the plurality of predictive models based on the determined user interactions with the plurality of content items.

18. The non-transitory machine-readable medium of claim 16, wherein the operations further comprise determining preferences of the user with respect to types of user interaction with other content items in the online service based on a user interaction history associated with the user, wherein the first composite score is further based on the determined preferences.

19. The non-transitory machine-readable medium of claim 16, wherein the operations further comprise associating the user with one or more user types based on user interaction history of past interactions of the user with content provided by a content service, wherein the identifying the at least one score is further based on the one or more user types, and wherein the identified at least one score is weighted more than at least one other score in the first plurality of scores when determining the first composite score.

* * * * *